United States Patent
Biasi et al.

(10) Patent No.: US 9,228,830 B2
(45) Date of Patent: Jan. 5, 2016

(54) ELECTROMECHANICAL DEVICE FOR MEASURING THE INCLINATION OF A SUPPORT PLANE WITH HIGH RESOLUTION, HIGH ACCURACY AND LOW SENSITIVITY TO OUTSIDE DISTURBANCES

(75) Inventors: Roberto Biasi, Bolzano (IT); Dietrich Pescoller, Badia (IT)

(73) Assignee: Microgate S.r.L., Bolzano (IT)

( * ) Notice: Subject to any disclaimer, the term of this patent is extended or adjusted under 35 U.S.C. 154(b) by 776 days.

(21) Appl. No.: 12/994,262

(22) PCT Filed: May 26, 2008

(86) PCT No.: PCT/IT2008/000346
§ 371 (c)(1),
(2), (4) Date: Dec. 20, 2010

(87) PCT Pub. No.: WO2009/144747
PCT Pub. Date: Dec. 3, 2009

(65) Prior Publication Data
US 2011/0093238 A1    Apr. 21, 2011

(51) Int. Cl.
*G01C 9/00* (2006.01)
*G01C 9/12* (2006.01)
*G01C 9/16* (2006.01)

(52) U.S. Cl.
CPC ... *G01C 9/12* (2013.01); *G01C 9/16* (2013.01)

(58) Field of Classification Search
CPC .................................. G01C 9/16; G01C 9/12
USPC .................. 702/154, 150, 151, 85, 94, 33
See application file for complete search history.

(56) References Cited

U.S. PATENT DOCUMENTS

| | | | | |
|---|---|---|---|---|
| 2,964,270 | A | * | 12/1960 | Mercier ........................ 244/80 |
| 3,983,636 | A | | 10/1976 | Fashbaugh et al. |
| 3,997,976 | A | | 12/1976 | Li |
| 4,152,940 | A | | 5/1979 | Saito |
| 4,334,226 | A | * | 6/1982 | Eguchi et al. ................ 342/355 |
| 4,561,299 | A | * | 12/1985 | Orlando et al. ............ 73/152.61 |
| 4,811,491 | A | * | 3/1989 | Phillips et al. ............. 33/366.12 |
| 5,081,865 | A | * | 1/1992 | Schechter et al. .......... 73/65.07 |
| 2002/0166756 | A1 | | 11/2002 | Thompson |
| 2007/0162251 | A1 | * | 7/2007 | Todd ............................. 702/150 |
| 2008/0134529 | A1 | * | 6/2008 | Van Luchene ............ 33/366.11 |
| 2009/0242279 | A1 | * | 10/2009 | Freydank et al. .......... 177/25.13 |
| 2010/0156653 | A1 | * | 6/2010 | Chaudhari et al. ......... 340/686.1 |

FOREIGN PATENT DOCUMENTS

GB      836717 A    6/1960

* cited by examiner

Primary Examiner — Sujoy Kundu
Assistant Examiner — Ricky Ngon
(74) Attorney, Agent, or Firm — Lando & Anastasi LLP

(57) ABSTRACT

An electromechanical device for measuring the inclination of a support plane with high resolution, high accuracy and low sensitivity to outside disturbances, comprising a first electromechanical pendulum system, controlled in a closed loop to measure the static rotations of an inverted pendulum pivoted to a supporting structure which can be associated with the support plane whose inclination is to be measured. The measurement is performed by measuring the mechanical torque required to keep the inverted pendulum in a neutral position, i.e., in a position which is substantially perpendicular to the support plane. This is made possible by a first motor which is associated with the inverted pendulum and turns it as a function of its angular deviation from the neutral position measured by a first position sensor associated with the inverted pendulum.

11 Claims, 2 Drawing Sheets

ELECTROMECHANICAL DEVICE FOR MEASURING THE INCLINATION OF A SUPPORT PLANE WITH HIGH RESOLUTION, HIGH ACCURACY AND LOW SENSITIVITY TO OUTSIDE DISTURBANCES

TECHNICAL FIELD

The present invention relates to an electromechanical device for measuring the inclination of a support plane with high resolution, high accuracy and low sensitivity to outside disturbances, such as for example magnetic or thermal disturbances or accelerations on the plane, et cetera.

BACKGROUND ART

Currently, known devices, designed to measure the inclination of a support plane and/or the like and commonly known as inclinometers, are commercially available.

More precisely, the main fields of use of such kinds of device can be the following:
- metrological correction of targeting systems which require precision in absolute terms, such as for example telescopes;
- monitoring ground stability, such as for example for predicting landslides;
- monitoring of civil structures, such as for example monuments;
- geodetic monitoring in regions affected by volcanic or bradyseism phenomena;
- dynamic analyses of civil structures.

Known devices are based on the classic bubble level, in which the air bubble is usually replaced with an electrolyte and measurement occurs by electronic means, allowing a high degree of resolution and accuracy.

These known types of devices are not devoid of drawbacks, which include the fact that if the plane whose inclination is to be measured is subject to horizontal movements, they are unable to distinguish between inclination and horizontal accelerations oriented at right angles to the gravity vector.

This problem occurs particularly in use in targeting systems, such as for example in telescopes.

In such applications, known types of devices are placed typically on the azimuth platform and, during the rapid targeting movements of telescopes, are subjected to large horizontal accelerations, which cause the measurement made to be unreliable.

Moreover, such horizontal accelerations can also lead to saturation of the device, preventing it from performing the measurement.

Another drawback of known types of devices consists in that they are dynamically slow if the inclinometer is brought to saturation as a consequence of high inclinations.

The reset times for performing an adequate reading of such devices can reach even several minutes. Such long times can occur as a consequence of a saturation of the device which can entail total immersion of the detectors by the liquid that is present within the device.

To allow the system to settle again and allow the detector to be completely dry, it is inevitably necessary to allow some time to elapse.

DISCLOSURE OF THE INVENTION

The aim of the present invention is to provide a device which allows measurements of the inclination of a support plane with high resolution, high accuracy and low sensitivity to outside disturbances such as, for example, magnetic or thermal disturbances or accelerations on the plane.

Within this aim, an object of the present invention is to provide a device which is dynamically fast.

Another object of the present invention is to provide a device which is highly reliable, relatively simple to provide and at competitive costs.

This aim and these and other objects which will become better apparent hereinafter are achieved by an electromechanical device for measuring the inclination of a support plane with high resolution, high accuracy and low sensitivity to outside disturbances, characterized in that it comprises a first electromechanical pendulum system, controlled in a closed loop to measure the static rotations of an inverted pendulum pivoted to a supporting structure which can be associated with the support plane whose inclination is to be measured by measuring the mechanical torque required to keep said inverted pendulum in a neutral position, i.e., substantially perpendicular to said support plane, by way of first motor means which are associated with said inverted pendulum and act thereon as a function of its angular deviation from said neutral position measured by first position sensor means associated with said inverted pendulum.

BRIEF DESCRIPTION OF DRAWINGS

Further characteristics and advantages of the invention will become better apparent from the description of a preferred but not exclusive embodiment of an electromechanical device for measuring the inclination of a support plane with high resolution, high accuracy and low sensitivity to outside disturbances, according to the present invention, illustrated by way of non-limiting example in the accompanying drawings, wherein.

WAYS OF CARRYING OUT THE INVENTION

Figure 1:
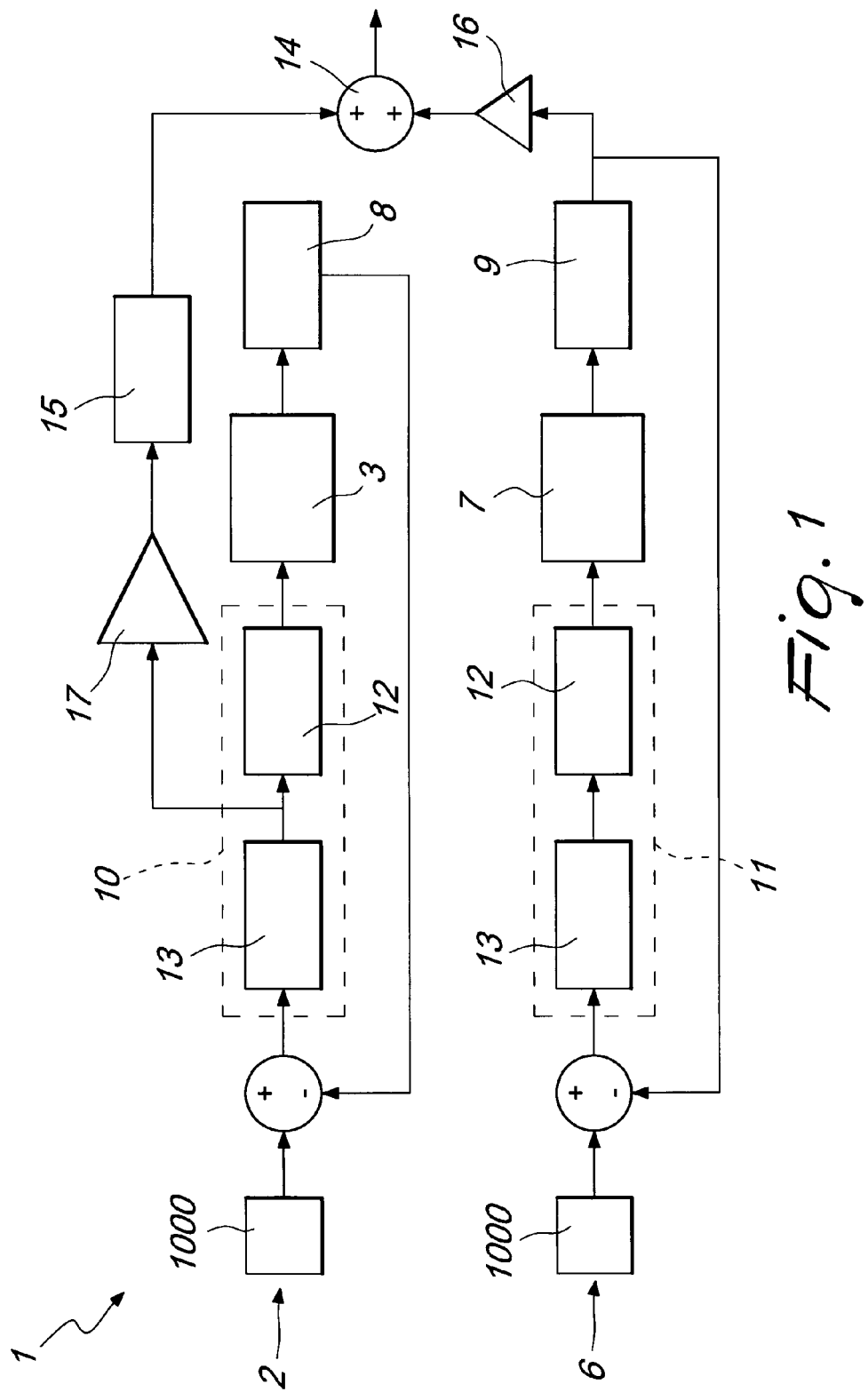
FIG. 1 is a block diagram of a device according to the present invention.

With reference to the Figures, the electromechanical device for measuring the inclination of the support plane with high resolution, high accuracy and low sensitivity to outside disturbances, generally designated by the reference numeral 1, comprises a first electromechanical pendulum system 2 (with a set point designated by the reference numeral 1000), controlled in a closed loop to measure the static rotations of an inverted pendulum 3 pivoted to a supporting structure 4 which can be associated with the support plane 5 whose inclination is to be measured, with respect to a starting position designated by 5a, and a second electromechanical pendulum system 6 (with a set point designated by the reference numeral 1000), also controlled in a closed loop and adapted to measure the dynamic rotations of a balanced pendulum 7 pivoted to the supporting structure 4.

The inclination of the support plane 5 is represented by the degree of freedom $O_1$.

The measurement of the static rotations of the inverted pendulum 3, represented by the degree of freedom $O_2$, is performed by measuring the mechanical torque required to keep the inverted pendulum 3 in the neutral position, i.e., substantially perpendicular to the support plane 5, by way of first motor means which are associated with the inverted pendulum 3 and act thereon as a function of its angular deviation from the neutral position.

This angular deviation is measured by first position sensor means 8 associated with the inverted pendulum 3.

The torque required to keep the inverted pendulum 3 in the neutral position is designated by the vector $M_c$.

The measurement of the dynamic rotations of the balanced pendulum 7, represented by the degree of freedom $O_3$, is performed by way of second position sensor means 9, which are associated with the balanced pendulum 7 and interact with second motor means which also are associated with the balanced pendulum 7.

In the illustrated embodiment, the first motor means and the second motor means respectively comprise electromagnetic motors 10 and 11, each of which comprises a VCM actuator 12 driven by a controller 13.

Both the first position sensor means 8 and the second position sensor means 9, for the closure of the corresponding control loop, can each comprise a pair of capacitive sensors which operate differentially.

The choice of electromechanical motors as actuators and of capacitive sensors as sensors arises from a specific technical choice which is not binding in any way.

The measurements of the static and dynamic rotations of the two pendulums 3 and 7, measured respectively by the two electromechanical systems 2 and 6, are processed by data processing means 14, which are associated with the two electromechanical systems for calculating the inclination $O_1$.

As explained in greater detail hereinafter, in order to clean from the measurement of the static rotations of the inverted pendulum 3 the dynamic rotations that are present also on the inverted pendulum 3, a low-pass filter 15 is provided, which is interposed between the output of the first electromechanical system 2 and the data processing means 14 in order to filter, with a preset cutoff frequency, the measurements made by the first electromechanical system 2.

Preferably, the cutoff frequency is equal to 0.5 Hz.

Since quantification of the static rotations and dynamic rotations is performed by measuring respectively a mechanical torque and an angular deviation, measurement conversion means 16 are provided which are interposed between the second electromechanical system 6 and the data processing means 14 to convert the measurement of the dynamic rotation of the balanced pendulum 7 into a format which is compatible with the measurement of the static rotation of the inverted pendulum 2.

In order to avoid errors in the measurements of the static and dynamic rotations of the two pendulums 3 and 7 caused by the presence of any hystereses linked to the type of mechanical hinge that can be used to provide the pivoting of the two pendulums 3 and 7 to the supporting structure 4, both pendulums 3 and 7 are obtained monolithically with the supporting structure 4.

Pivoting is provided by interposing between the pendulum being considered, 3 or 7, and the supporting structure 4 a portion of material which is elastically flexible enough to provide a hinge coupling.

The material that can be used to provide to the two pendulums 3 and 7 and the supporting structure 4 is usually titanium.

Other materials, such as for example aluminum, steel and sintered materials, can be used as a replacement of titanium according to the specific application.

Operation of the device 1 according to the invention is as follows.

Figure 2:
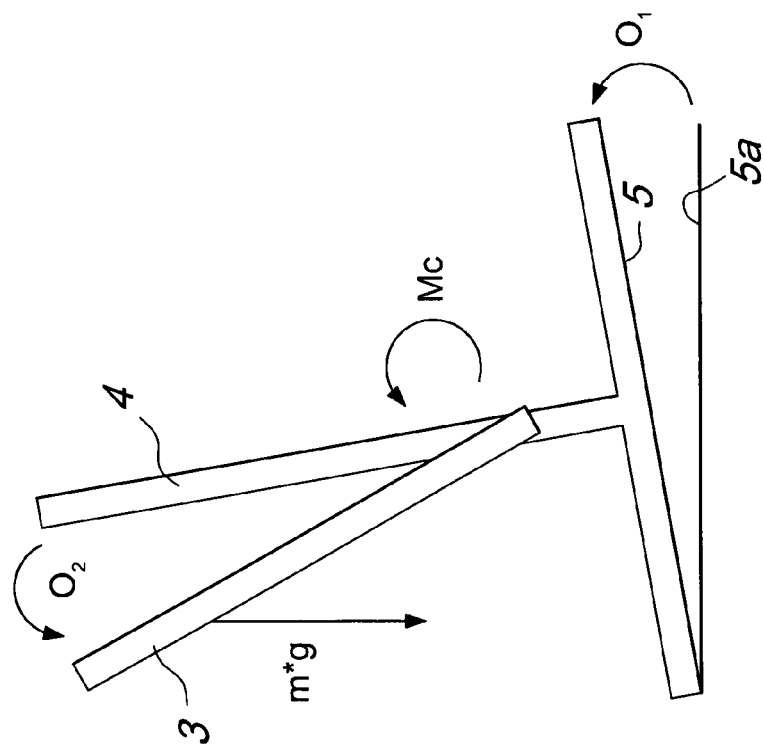
FIG. 2 is a schematic beam representation of the inverted pendulum, according to the present invention.

With reference to FIG. 2, the equation of state that describes the inverted pendulum 3 is the following:

$$J*O_2''=-k*O_2+3*g*l*(O_1+O_2)+M_c$$

where:
J is the moment of inertia of the inverted pendulum 3;
$O_2$ is the angle of the pendulum with respect to its zero position, such angle is acquired by means of the capacitive sensors;
k is the elastic constant of the hinge;
m is the mass of the inverted pendulum 3;
g is the gravitational acceleration;
l is the distance between the center of gravity and the hinge;
$O_1$ is the inclination of the support plane 5;
$M_c$ is the torque generated by the electromagnetic motor associated with the inverted pendulum 3.

Assuming angular deviations which are small enough to approximate the sine of the angle with said angle and considering that the angle $O_2$ is kept equal to zero by means of the servo controller 13 associated with the inverted pendulum 3, the angle $O_1$ is equal to:

$$O_1=-M_c/(m*g*l)$$

It is therefore possible to determine the angle $O_1$ by knowing the mechanical torque $M_c$, which obviously can be measured, and the physical values of the inverted pendulum 3.

With reference to FIG. 1, the block that represents the transfer function of the system described above is designated by the reference numeral 17 and has in input the measurement of the mechanical $M_c$ and in output the equivalent inclination $O_1$ of the support plane 5.

In other words, the physical value that leads to knowledge of the inclination of the plane is the force required to keep the inverted pendulum 3 centered.

As regards the design of the inverted pendulum 3, the following remarks have been made: the transfer function between the torque $M_c$ and the angle $O_2$ has a double pole which oscillates with its own frequency determined by the root of k/J.

This proper frequency of the system deteriorates the control and therefore the measurement.

In order to obviate this problem, the pendulum is built so as to make the elastic constant k of the hinge coincide with the product of m*g*l.

This is equivalent to canceling the contrast torque generated by the hinge with the torque generated by the force of gravity, which acts on the center of gravity of the inverted pendulum 3.

In this manner, the servo controller 13 no longer sees an oscillating mass, but sees a pure mass and is thus able to maintain the position of the pendulum more perfectly at the center, further improving the resolution.

Figure 3:
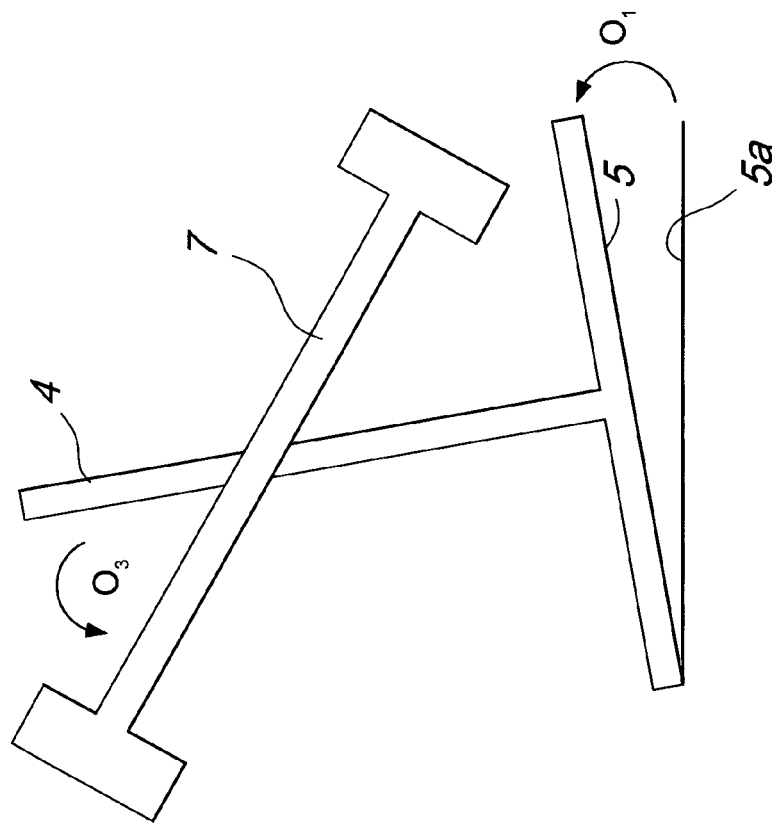
FIG. 3 is a schematic beam representation of the balanced pendulum, according to the present invention.

With reference to FIGS. 1 and 3, the second electromechanical system 6, which comprises the balanced pendulum 7, is designed to obviate any accelerations on the plane experienced by the inverted pendulum 3 and therefore affecting the rotations of said pendulum.

If the balanced pendulum 7 is subjected to an acceleration, the forces that act on the masses of the pendulum are discharged directly onto the hinge and no movement occurs with respect to the supporting structure 4.

If the support plane 5 undergoes a rotation, the balanced pendulum 7 rotates with respect to the supporting structure 4, since the balanced pendulum 7, due to its inertia, does not follow instantaneously the rotation of the supporting structure 4.

The balanced pendulum 7 begins to turn only due to the torque that is transferred to the hinge.

The angle $O_3$ that forms between the balanced pendulum 7 and the supporting structure 4 becomes the measurement of the instrument, which is measured directly by capacitive sensors of the second position sensor means 9.

Therefore, after a rotation the balanced pendulum 7 returns again to its equilibrium position, i.e., with the angle $O_3$ which is nil.

This points out that the second electromechanical system 6 is able to measure only dynamic rotations and not static ones.

To avoid the transfer of torque to the balanced pendulum 7, one might consider using bearings instead of the portion of flexible material that defines the hinge coupling.

However, this solution is not conceivable, since there are no bearings that offer the required level of precision and hysteresis.

The servo controller 13 associated with the balanced pendulum 7 is designed to slowly return the balanced pendulum 7 always to the initial position.

The combination of the two electromechanical systems 2 and 6 provides an overall device 1 which has the desired features.

As already noted and with reference to FIG. 1, the output of the first electromechanical system 2 is filtered by a low-pass filter 15 with a cutoff frequency generally equal to 0.5 Hz.

In this manner, only the static portion, which is scarcely variable, is taken from the first electromechanical system 2.

The dynamic portion is derived exclusively from the second electromechanical system 6.

The output of the second electromechanical system 6 is not filtered with a high-pass filter, since the controller 13 associated with the balanced pendulum 7 is configured in such a manner as to have a higher sensitivity, equal to 0.5 Hz.

The sum of the two outputs of the two electromechanical systems 2 and 6, performed by the data processing means 14, provides the measurement of the inclination $O_1$ of the support plane 5.

In practice it has been found that the electromechanical device for measuring the inclination of a support plane according to the invention fully achieves the intended aim and objects, since it allows to measure the inclination of a support plane with high resolution, high accuracy and low sensitivity to outside disturbances.

Another advantage of the device according to the present invention consists in that optimization of the dynamic response has been achieved by means of a mechanical limitation of the maximum stroke of the measurement components.

Another advantage of the device according to the present invention consists in that it is entirely insensitive to thermal stresses.

Another advantage of the device according to the present invention consists in that it is totally insensitive to electromagnetic fields.

Another advantage of the device according to the present invention consists in that it is extremely repeatable due to the absence of mechanical parts affected by hysteresis.

Another advantage of the device according to the present invention consists in that it has an attainable resolution of less than one microradian with a range of approximately plus or minus one milliradian.

The device thus conceived is susceptible of numerous modifications and variations, all of which are within the scope of the inventive concept; all the details may further be replaced with other technically equivalent elements.

In practice, the materials used, as well as the contingent shapes and dimensions, may be any according to requirements and to the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. An electromechanical device for measuring an inclination of a support plane with high resolution, high accuracy and low sensitivity to outside disturbances, comprising a first electromechanical pendulum system, controlled in a closed loop to measure the static rotations of an inverted pendulum which is pivoted to a supporting structure which is associated with the support plane whose inclination is to be measured by measuring the mechanical torque required to keep said inverted pendulum in a neutral position, perpendicular to said support plane, by way of first motor means which are associated with said inverted pendulum and act thereon as a function of its angular deviation from said neutral position measured by first position sensor means associated with said inverted pendulum, and further comprising a second electromechanical pendulum system, mechanically independent from said first electromechanical pendulum system, which is controlled in a closed loop to measure dynamic rotations of a balanced pendulum which is pivoted to said supporting structure by way of second position sensor means which are associated with said balanced pendulum and interact with second motor means which are associated with said balanced pendulum.

2. The device according to claim 1, further comprising data processing means which are associated with said first and second electromechanical pendulum systems to calculate said inclination.

3. The device according to claim 2, further comprising a low-pass filter which is interposed between the output of said first electromechanical pendulum system and said data processing means and is adapted to filter with a preset cutoff frequency the measurements made by said first electromechanical pendulum system.

4. The device according to claim 3, wherein said cutoff frequency is preferably equal to 0.5 Hz.

5. The device according to claim 2, further comprising measurement conversion means which are interposed between said second electromechanical pendulum system and said data processing means to convert the measurement of said dynamic rotation of said balanced pendulum into a format which is compatible with the measurement of said static rotation of said inverted pendulum.

6. The device according to claim 1, wherein said inverted pendulum is obtained monolithically with said supporting structure, with the interposition, between said inverted pendulum and said supporting structure, of a first portion of material which is elastically flexible enough to provide a hinge coupling.

7. The device according to claim 1, wherein said balanced pendulum is obtained monolithically with said supporting structure, with the interposition, between said balanced pendulum and said supporting structure, of a second portion of material which is elastically flexible enough to provide a hinge coupling.

8. The device according to claim 1, wherein said first motor means comprise first electromagnetic motors.

9. The device according to claim 1, wherein first position sensor means comprise first capacitive sensors.

10. The device according to claim 1, wherein said second motor means comprise second electromagnetic motors.

11. The device according to claim 1, wherein said second position sensor means comprise second capacitive sensors.

* * * * *